May 17, 1932.  D. E. DECKER  1,858,661
CAMERA
Filed Sept. 8, 1930  3 Sheets-Sheet 1
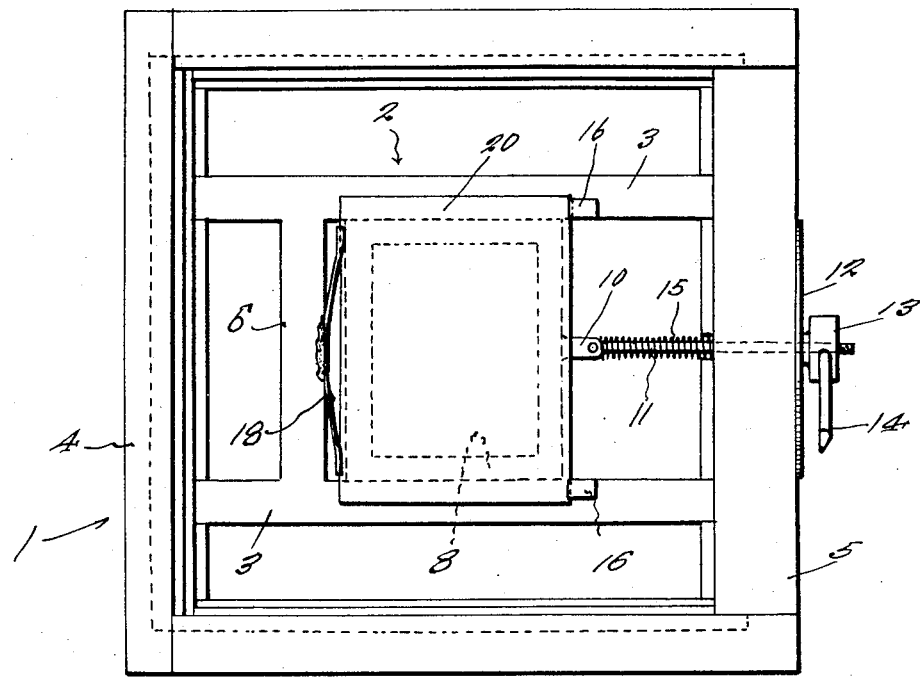
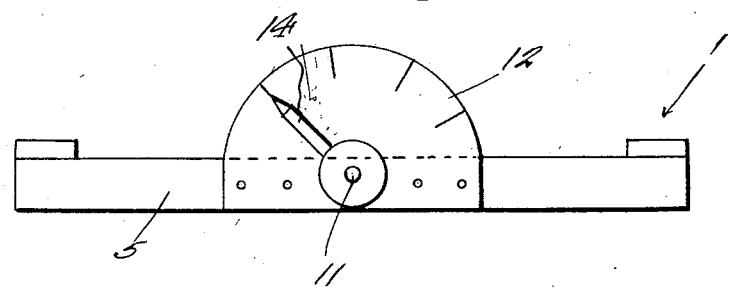
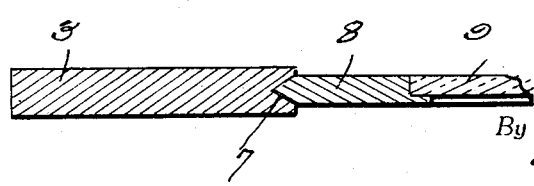
Inventor
D. E. Decker
By Clarence A. O'Brien
Attorney

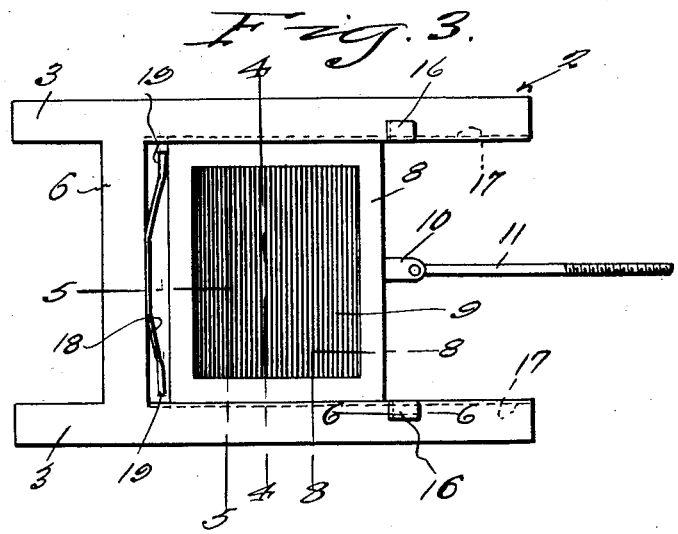
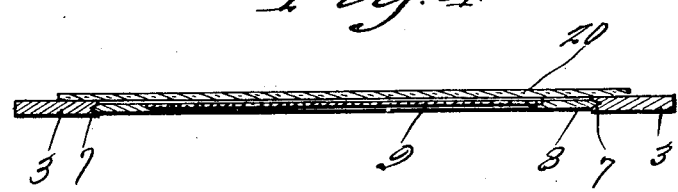
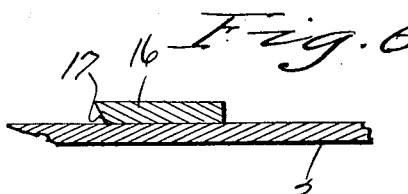
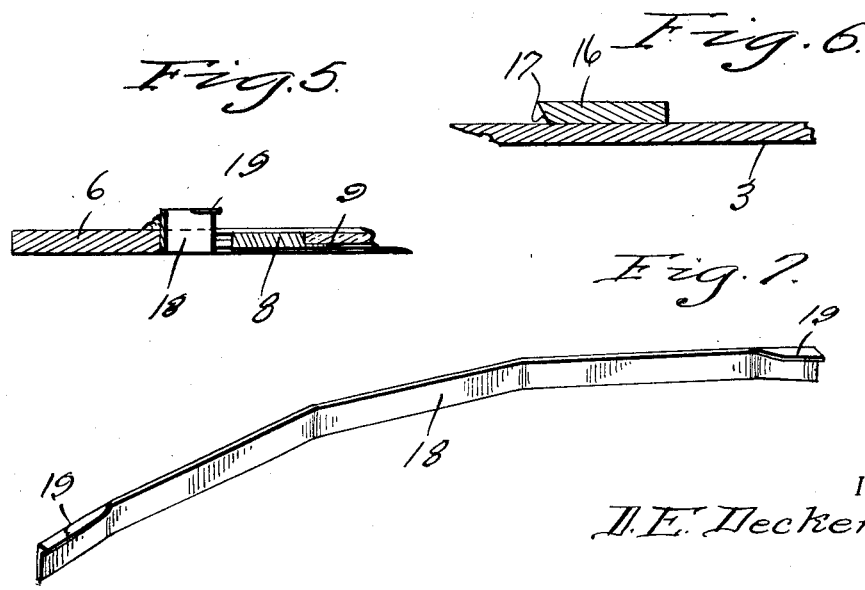

May 17, 1932.    D. E. DECKER    1,858,661
CAMERA
Filed Sept. 8, 1930    3 Sheets-Sheet 3

Inventor
D. E. Decker
By Clarence A. O'Brien
Attorney

Patented May 17, 1932

1,858,661

UNITED STATES PATENT OFFICE

DELANIA E. DECKER, OF JEFFERSONVILLE, INDIANA

CAMERA

Application filed September 8, 1930. Serial No. 480,513.

This invention relates to a camera and more particularly to a new and useful improvement in a camera plate holder and has for its primary object to provide, in a manner as hereinafter set forth, a device of this character including means for holding the plate in the camera and further including a manually shiftable grid screen disposed in front of the plate, the purpose of the grid screen being to expose a portion of the plate upon which one exposure is made after which the screen is twisted in such a manner that the bars thereof will cover the portions of the screen upon which the exposure has been made and expose those portions of the plate which were formerly covered by the screen to permit another exposure to be made on the plate.

Another important object of the invention is to provide a camera plate holder embodying novel means for shifting the grid screen a predetermined distance relative to the plate in the camera for permitting two or more exposures to be made on different portions of the plate.

Other objects of the invention are to provide a camera plate holder of the character described which will be simple in construction, strong, durable, efficient in operation and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:

Figure 1 is a view in elevation looking into a plate holder for cameras constructed in accordance with this invention, Figure 2 is a view in side elevation of the device, Figure 3 is a detail view in elevation of the grid screen slidably mounted in its support, said support also embodying means for securing the plate in position, Figure 4 is a sectional view taken substantially on the line 4—4 of Figure 3 with a plate mounted in position, Figure 5 is a fragmentary sectional view taken substantially on the line 5—5 of Figure 3, Figure 6 is a fragmentary sectional view taken substantially on the line 6—6 of Figure 3, Figure 7 is a detail view in perspective of the plate retaining spring, Figure 8 is a fragmentary sectional view taken substantially on the line 8—8 of Figure 3, Figure 9 is a fragmentary view in elevation showing the arrangement of the bars of a grid screen when two exposures are to be made on a plate.

Figure 9:
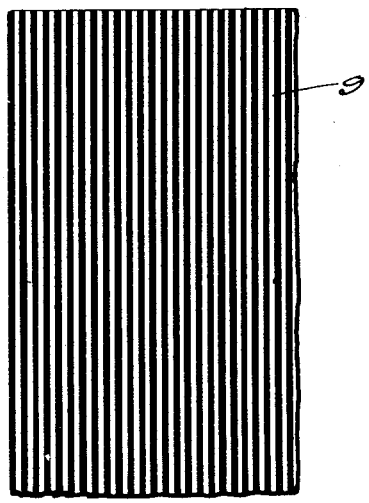

Referring to the drawings in detail, it will be seen that the reference numeral 1 designates a conventional camera plate holder which comprises a substantially rectangular frame. A combined grid screen and plate support designated generally as by the reference numeral 2 is detachably mounted transversely in the holder 1 and comprises the spaced, parallel, flat metallic bars 3 which extend between the side members 4 and 5 of the frame 1 and the integral connecting bar 6 which is disposed adjacent the side bar 4 of the frame 1 when the support 2 is in position therein.

The opposed edges of the bars 3 have formed therein substantially V-shaped channels 7 (see Figures 3, 4 and 8) for slidably receiving the marginal edges of a grid screen frame 8 having mounted therein the grid screen 9. The grid screen is inserted in the holder 2 at the end of said holder which is remote from the connecting bar 6 of said holder. An ear 10 extends from the screen frame 8 toward the side member 5 of the plate holder 1 and pivotally connected to the ear 10 is a screen actuating rod 11 having a threaded end portion extending slidably through an opening provided therefor in the side member 5 of the plate holder 1. A graduated plate 12 is fixed on the side member 5 through which the rod 11 rotatably extends and threaded on the outer end portion of the rod 11 is an adjusting disk 13 having an indicating finger 14 projecting laterally therefrom for cooperation with the plate 12.

A coil spring 15 is mounted on the rod 11 between the side member 5 and the screen frame 8 and yieldingly urges the screen frame toward the connecting bar 6 of the support 2 in a manner to engage the adjusting disk 13, against the plate 12. It will thus be seen that the adjusting disk 13 normally retains the screen frame 8 against sliding movement in one direction by the spring 15.

By rotating the adjusting disk 13 in one direction the screen 9 and its frame 8 are moved toward the side member 5 of the plate holder 1 and by rotating the adjusting disk 13 in the opposite direction the screen 9 and the frame 8 will be moved in the other direction by the spring 15, as will be apparent.

Formed integrally on each of the bars 3 of the support 2 on one side of said bars and adjacent the opposed edges thereof are the plate engaging lugs 16 having the beveled plates engaging edges 17 which are best seen in Figure 6 of the drawings. The lugs 16 are spaced from the connecting bar 6 of the holder 2.

A plate retaining spring 18 has its intermediate portion secured in any suitable manner, as by soldering or welding, to the intermediate portion of the edge of the connecting bar 6 of the support 2 which is opposed to the side member 5 of the holder 1.

The end portions of the spring 18 are directed away from the connecting bar 6 in the manner clearly illustrated in Figure 1 of the drawings. The spring 18 is of a width materially greater than the thickness of the connecting bar 6 and, consequently, one of the marginal portions of said spring 18 projects outwardly from the side of the holder 2 upon which the lugs 16 are mounted, as best illustrated in Figure 5.

Integral flanges 19 are formed on the projecting marginal portion of the spring 18 at the opposite ends of said spring for engagement over the plate 20 which is mounted on the holder 2 over the grid screen 9 between the lugs 16 and the spring 18.

In this manner the plate 20 is mounted stationary on the holder 2 and the screen 9 is slidably supported therebehind.

When two exposures are to be made on the plate 20 the bars of the grid screen 9 are of a width corresponding to the adjacent transparent portions of the screen, as seen in Figure 9 of the drawings.

When three exposures are to be made on the plate 20 a screen 21 (see Figure 10) is mounted in the holder 2 in which the bars are double the width of the adjacent transparent portions of the screen.

Figure 11:
Figure 11 is a view of the completed photographs showing same mounted in position in the frame in back of a grid screen with one of the pictures exposed to view.
Figure 12:
Figure 12 is a view of the completed photograph with the other picture exposed to view.
Figure 13:
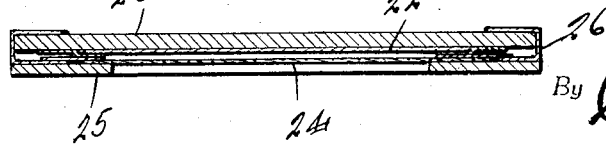
Figure 13 is a sectional view taken substantially on the line 13—13 of Figure 11.

In Figures 11 to 13 inclusive of the drawings there is shown a completed photograph which has been produced with this invention and same is designated by the reference numeral 22, the picture being mounted on a supporting back 23. A grid screen 24 is shiftably supported in front of the picture 22 in the frame 25 which, in turn, is shiftably secured to the backing 23 by the flexible material 26. As will be apparent, by manually shifting the screen 24 laterally relative to the picture 22, the exposures on said picture 22 will be alternately revealed and concealed through the screen.

In use, when the first exposure is to be made on the plate 20, the grid screen 9 is disposed in its closest position to the connecting bar 6 on the support 2. The plate 20 is mounted in position on the support 2 and secured by the lugs 16 and the spring 18 as hereinbefore explained. The first exposure is then made and the adjusting disk 13 is actuated to shift the screen 9 toward the side member 5 of the plate holder 1 in a manner to uncover an unexposed portion of the plate 20. The proper distance to shift the screen 9 may be expeditiously determined through the medium of the indicating arms 14 and the plate 12.

Figure 10:
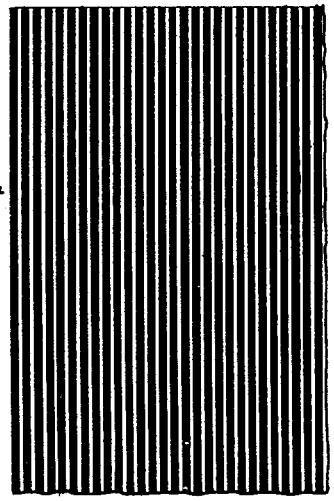
Figure 10 is a fragmentary view of a grid screen showing the arrangement of the bars when three exposures are to be made on a plate.

When the screen 9 has been thus shifted the second exposure is made on the newly exposed portion of the plate 20. If three exposures are to be made on the plate 20, a screen in accordance with that illustrated in Figure 10 is mounted in the holder 2 and after the second exposure has been made, the screen is again shifted through the medium of the adjusting disk 13 to expose another portion of the plate 20 as will be understood.

As best seen in Figure 4 of the drawings, the plate 20 is supported on the holder 2 in spaced relation to the screen 9 and the frame 8, thus preventing contact of the plate with said screen and frame and preventing the plate from being damaged when the screen and plate are shifted.

It is believed that the many advantages of a camera constructed in accordance with this invention will be readily understood, and although the preferred embodiment of the invention is as illustrated and described, it is to be understood that changes in the details of construction may be had which will fall within the scope of the invention as claimed.

What is claimed as new is:

A camera including a plate holder, a pair of spaced, parallel bars removably mounted in the holder and having channels in their opposed edges, an integral connecting bar extending between the first named bars adjacent one end of said first named bars, a pair of plate retaining lugs formed integrally on one side of the first named bars in spaced relation to the connecting bar, an elongated spring having an intermediate portion secured to the connecting bar on the edge thereof adjacent the retaining lugs, the ends of the spring extending away from the connecting bar, integral plate engaging flanges on the end portions of the spring, said spring engageable with the plate in a manner to yieldingly engage said plate against the lugs and, in conjunction with the lugs constituting means for releasably securing the plate on the first named bars, each lugs being bevelled on its plate engaging edge to form a space between itself and a bar to receive a portion of the plate; a screen frame slidably mounted in the channels in the first named bars, a grid screen fixed in the screen frame, a rod connected to the screen frame and passing through a part of the holder, a dial plate on said part of the holder through which the rod passes, the outer end of the rod being threaded, a nut on the threaded end bearing against the dial plate and a finger on the neck co-operating with the dial to indicate the amount of movement of the screen frame.

In testimony whereof I affix my signature.

DELANIA E. DECKER.